(12) United States Patent
Wu (10) Patent No.: US 12,099,745 B2
(45) Date of Patent: Sep. 24, 2024

(54) DATA STORAGE DEVICE AND METHOD FOR DYNAMICALLY DETERMINING A BUFFER SIZE

(71) Applicant: Silicon Motion, Inc., Hsinchu County (TW)

(72) Inventor: Po-Wei Wu, New Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/218,014

(22) Filed: Jul. 4, 2023

(65) Prior Publication Data

US 2024/0201892 A1    Jun. 20, 2024

(30) Foreign Application Priority Data

Dec. 14, 2022 (TW) .................................. 111148027

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0659; G06F 3/0635; G06F 3/0604; G06F 3/0679; G06F 2212/601; G06F 12/0871; G06F 12/0804; G06F 12/0811; G06F 12/02
See application file for complete search history.

(56) References Cited

U.S. PATENT DOCUMENTS

| | | | |
|---|---|---|---|
| 2012/0311293 A1* | 12/2012 | Nemazie | G06F 12/0893 711/171 |
| 2018/0081590 A1 | 3/2018 | Farahani | |
| 2019/0129848 A1 | 5/2019 | Hu | |
| 2021/0109673 A1 | 4/2021 | Kim | |
| 2021/0232339 A1* | 7/2021 | Mehra | G06F 3/061 |
| 2023/0297279 A1* | 9/2023 | Leonard | G06F 12/0811 711/154 |
| 2024/0202126 A1* | 6/2024 | Du | G06F 12/0871 |

FOREIGN PATENT DOCUMENTS

| | | |
|---|---|---|
| CN | 112905500 B | 6/2022 |
| TW | I456392 B | 10/2014 |
| TW | I587131 B | 6/2017 |
| TW | 202129510 A | 8/2021 |

* cited by examiner

*Primary Examiner* — Tracy C Chan
(74) *Attorney, Agent, or Firm* — Winston Hsu (57) ABSTRACT

A data storage device includes a memory device and a memory controller. The memory device has a corresponding total storage capacity and includes multiple memory blocks. The total storage capacity is set to a maximum storage capacity provided by the memory blocks by default. The memory blocks include one or more predetermined memory blocks configured as a buffer to receive data from a host device. The memory controller is coupled to the memory device to access the memory device. In response to setting of a maximum amount of write data, the memory controller determines a value of the total storage capacity according to the maximum amount of write data, and determines a number of said one or more predetermined memory blocks according to the value of the total storage capacity and the maximum storage capacity.

15 Claims, 4 Drawing Sheets

| MAX_Write | 300GB | 450GB | 600GB | 900GB |
| --- | --- | --- | --- | --- |
| Cache_Size | 300GB | 225GB | 150GB | 135GB |
| Speed drop time | N/A | 50% | 25% | 15% |

DATA STORAGE DEVICE AND METHOD FOR DYNAMICALLY DETERMINING A BUFFER SIZE

BACKGROUND OF THE INVENTION

1. Field of the Invention

The invention relates to a method for determining a buffer size, more particularly to a method for dynamically determining a buffer size based on data storage system requirements or user requirements.

2. Description of the Prior Art

With the rapid growth of data storage technology in recent years, many data storage devices-such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes.

Usually, the data storage device configures a write buffer to receive data from the host. Configurations of the type and size of the write buffer will affect write speed of the data, and also affect arrangement of the data size in the write operation of writing data into the data storage device by the host, and finally affect the access performance of the data storage device. In addition, the access performance of the data storage device will dominate the user experience. Therefore, how to accurately estimate or determine the current write buffer size that can be configured (the currently configurable buffer size) to avoid significant change in the write speed of the data as well as to maintain better user experience is a topic worthy of considering in the field of data storage.

SUMMARY OF THE INVENTION

It is an objective of the invention to provide a method for dynamically determining a buffer size to avoid significant change in the write speed of the data as well as to maintain better user experience.

According to an embodiment of the invention, a data storage device comprises a memory device and a memory controller. The memory device has a corresponding total storage capacity and comprises a plurality of memory blocks. A value of the total storage capacity is set to a maximum storage capacity provided by the memory blocks by default and the memory blocks comprise one or more predetermined memory blocks configured to receive data from a host device. The memory controller is coupled to the memory device to access the memory device. In response to a setting of a maximum amount of write data, the memory controller determines the value of the total storage capacity according to the maximum amount of write data, and determines a number of said one or more predetermined memory blocks according to the value of the total storage capacity and the maximum storage capacity.

According to an embodiment of the invention, a method for dynamically determining a buffer size comprises: determining a value of a total storage capacity corresponding to a memory device in response to a setting of a maximum amount of write data, wherein the memory device comprises a plurality of memory blocks, the memory blocks comprise one or more predetermined memory blocks configured as a buffer to receive data from a host device and the maximum amount of write data is set by a user; and determining a number of said one or more predetermined memory blocks according to the value of the total storage capacity and a maximum storage capacity, wherein the maximum storage capacity is a maximum of storage capacity provided by the memory blocks.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
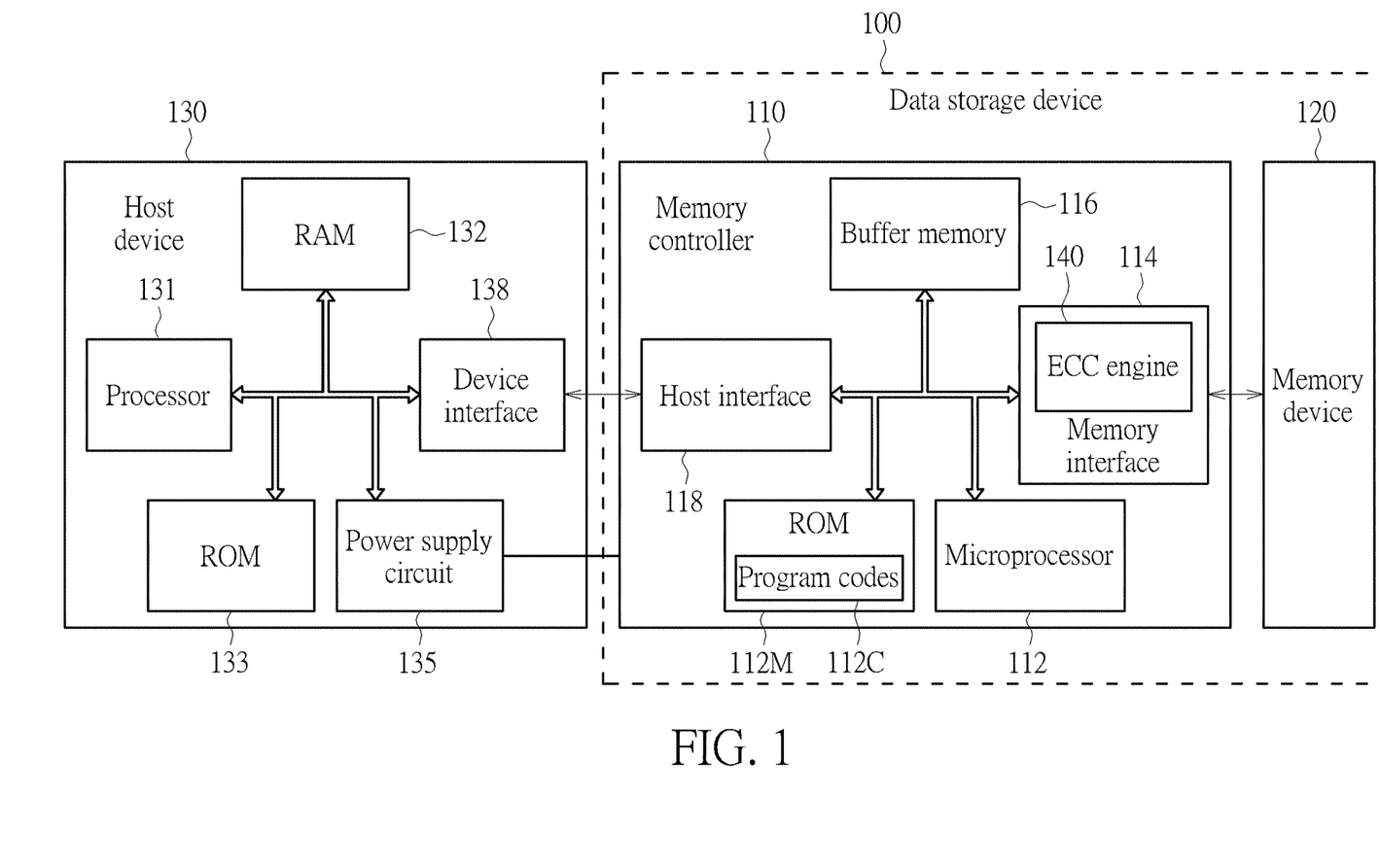
FIG. 1 shows an exemplary block diagram of a data storage system according to an embodiment of the invention.

FIG. 1 shows an exemplary block diagram of a data storage system according to an embodiment of the invention. The data storage system may comprise a host device 130 and a data storage device 100. The host device 130 may comprise at least one processor 131, at least one random access memory (RAM) 132, such as at least one dynamic RAM (DRAM), at least one static RAM (SRAM), . . . etc.

(not shown in FIG. 1), at least one Read Only Memory (ROM) 133, a power supply circuit 135, and a device interface 138.

The host device 130 accesses the data storage device 100 through the device interface 138. The processor 131, the device interface 138, the RAM 132 and the ROM 133 may be coupled to each other through a bus, and may be coupled to the power supply circuit 135 to obtain power. The processor 131 may be arranged to control operations of the host device 130. The ROM 133 is configured to store program codes. The processor 131 is configured to execute the program codes, thereby controlling operations to the host device 130.

The power supply circuit 135 may be arranged to provide the processor 131, the device interface 138, the RAM 132 and ROM 133 with power as well as provide the data storage device 100 with power through the bus or the power lines. For example, the power supply circuit 135 may output one or more driving voltages to the data storage device 100. The data storage device 100 may obtain the one or more driving voltages from the host device 130 as the power of the data storage device 100 and provide the host device 130 with storage space.

The data storage device 100 may comprise a memory device 120 and a memory controller 110. The memory controller 110 is configured to access the memory device 120 and control operations of the memory device 120. The memory device 120 may be a non-volatile (NV) memory (e.g., a Flash memory) device and may comprise one or more memory elements (e.g., one or more Flash memory dies, or one or more Flash memory chip, or the likes).

According to an embodiment of the invention, the host device 130 may issue commands, such as the read command or the write command, to the data storage device 100, so as to access the data stored in the memory device 120, or the host device 130 may issue commands to further control or manage the data storage device 100.

According to an embodiment of the invention, the memory controller 110 may comprise a microprocessor 112, a ROM 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g., read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an error correction code (ECC) engine 140. The ECC engine 140 may comprise a data buffer (not shown in FIG. 1) for buffering data to assist the ECC engine 140 in performing the encoding and decoding on the data. In the write procedure to write data into the memory device 120, the ECC engine 140 is configured to encode the data to be written into the memory device 120, such as performing the ECC encoding, so as to generate extra parity bits. In the read procedure to read data from the memory device 120, the ECC engine 140 is configured to decode the data read from the memory device 120 to detect the error bit(s) in the data and correct the value(s) of the error bit(s) when the error is correctable (e.g., the number of error bits does not exceed the maximum number of error bits that can be corrected by the ECC engine 140).

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. Similarly, the host device 130 may use the device interface 138 to communicate with the memory controller 110 in compliance with the same standard communication protocol.

For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. The host device 130 combined with the data storage device 100 as a whole may be a data storage system or a data storage system in an electronic device system. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be the electronic device comprising the data storage device 100 and the host device 130 combined with the data storage device 100 as a whole may also be a data storage system.

Generally, the memory controller 110 may configure one or more predetermined memory blocks as a cache memory, or called a buffer, or the predetermined memory blocks may also be named as the current blocks or active blocks, to receive data from the host device 130. The configured predetermined memory blocks may be Single-Level Cell (SLC) memory blocks, Multiple-Level Cell (MLC) memory blocks, Triple-Level Cell (TLC) memory blocks, or other types of memory blocks with further more levels. When the usage of the buffer reaches a certain level, the memory controller 110 may perform a data rearrangement operation to write the data stored in the buffer into another memory block. As an example, in an embodiment of configuring the SLC memory blocks as the buffer, the memory controller may merge and write the data stored in multiple SLC memory blocks into a TLC memory block. In this manner, the memory blocks may be utilized in a more efficient way.

However, the data rearrangement operation usually causes a write speed drop of the memory device. For example, assuming that the memory controller 110 receives a write command from the host device 130 to request to write the data that the user wants to store into the memory device 120 at the same time while performing data rearrangement operation in the background, since the memory controller 110 has to perform the data rearrangement operation and the data write operation at the same time, the user will notice an obvious drop in the write speed. Such phenomenon is called the speed drop of the data storage device.

In order to avoid or delay the occurrence of speed drop, or reduce the frequency of speed drop to occur, a method for dynamically determining a buffer size is proposed. In the proposed method for dynamically determining the buffer size, a tradeoff between an access speed of the data storage device 100 and available memory space is achieved by dynamically determining the buffer size and performing the corresponding configurations, and the setting of the buffer size satisfies the needs of the user. In addition, good user experience is effectively maintained by implementing the proposed method. As described above, the memory device 120 may comprise a plurality of memory blocks and the memory blocks comprise one or more predetermined memory blocks configured to receive data from the host device 130, wherein said one or more predetermined memory blocks may be the aforementioned buffer. The memory controller 110 may configure a specific number of memory blocks as the buffer by selecting the specific number of memory blocks from the memory blocks or from the spare memory blocks that are not written with data for being the predetermined memory blocks and configuring the selected memory blocks as a specific type of memory blocks, such as configuring the selected memory blocks as SLC memory blocks via an erase operation, and then configuring the specific number of memory blocks with the specific type as the buffer to receive data from the host device 130. In addition, the buffer size may be defined by the number of predetermined memory blocks configured as the buffer. For example, since a predetermined memory block provides a predetermined storage capacity, the corresponding buffer size (storage capacity) can be deduced according to the number of configured predetermined memory blocks.

According to an embodiment of the invention, the memory device 120 may have a corresponding total storage capacity, the storage capacity provided by the overall memory blocks comprised in the memory device 120 may correspond to a maximum storage capacity, and a value of the total storage capacity may be set to the maximum storage capacity that the overall memory blocks can provide by default. As an example, suppose that the memory device 120 comprises 300 memory blocks, and the actual storage capacity provided by a memory block may vary based on the type of memory block. Assuming that one memory block is able to store 1 GB (gigabyte) data when it is configured as an SLC memory block and suppose that the TLC memory block, which is the highest level among the configurable types of memory block, is able to store 3 GB data, the storage capacity provided by the overall memory blocks comprised in the memory device 120 may vary within the range from 300 GB (when all the memory blocks are configured as SLC memory blocks) to 900 GB (when all the memory blocks are configured as TLC memory blocks).

Generally, the data storage device does not distinguish between total storage capacity and maximum storage capacity. For example, in the existing design, the total storage capacity provided by one memory device is its maximum storage capacity (i.e., the maximum of storage capacity). Therefore, the memory controller usually uses one parameter to record the upper limit of the storage capacity of the memory device (that is, the aforementioned maximum storage capacity) and in the product specification label, the marked memory size is the upper limit of the storage capacity of the memory device. When the data storage device is connected to the host device, the maximum storage capacity of the data storage device identified by the host device is the aforementioned upper limit of the storage capacity of the memory device. Therefore, in the existing design, for a data storage device, the maximum storage capacity identified by the host device is a fixed value.

Different from the existing design, in an embodiment of the invention, the memory controller 110 may use two parameters to respectively record the total storage capacity corresponding to the memory device 120 and the maximum storage capacity thereof. As an example, the memory controller 110 may use the parameter Total_Capacity to record the total storage capacity corresponding to the memory device 120 and use the parameter MAX_Capacity to record the maximum storage capacity corresponding to the memory device 120, where the value of the parameter Total_Capacity is variable, and the value of the parameter MAX_Capacity is fixed (means that the value is not changed). In the embodiments of the invention, the value of the parameter Total_Capacity varies with the buffer size determined or configured by the memory controller 110, where the buffer size determined or configured by the memory controller 110 is flexibly adjusted based on the user requirements. Therefore, in the embodiments of the invention, the total storage capacity corresponding to the memory device 120 is correspondingly adjusted based on the user requirements and the maximum storage capacity identified by the host device 130 varies with the total storage capacity corresponding to the memory device 120. That is, in the embodiments of the invention, the maximum of storage capacity of the data storage device 100 identified by the host device 130 varies with the value of the total storage capacity corresponding to the memory device 120. In addition, the host device 130 may display the maximum of storage capacity of the data storage device 100 identified by itself on a user interface through a display device or a screen. Therefore, in the embodiments of the invention, the information regarding the memory size received or perceived by the user may also vary with the requirement input by the user or vary with the buffer size determined or configured by the memory controller 110. More details are provided in the following paragraphs.

Figure 2:
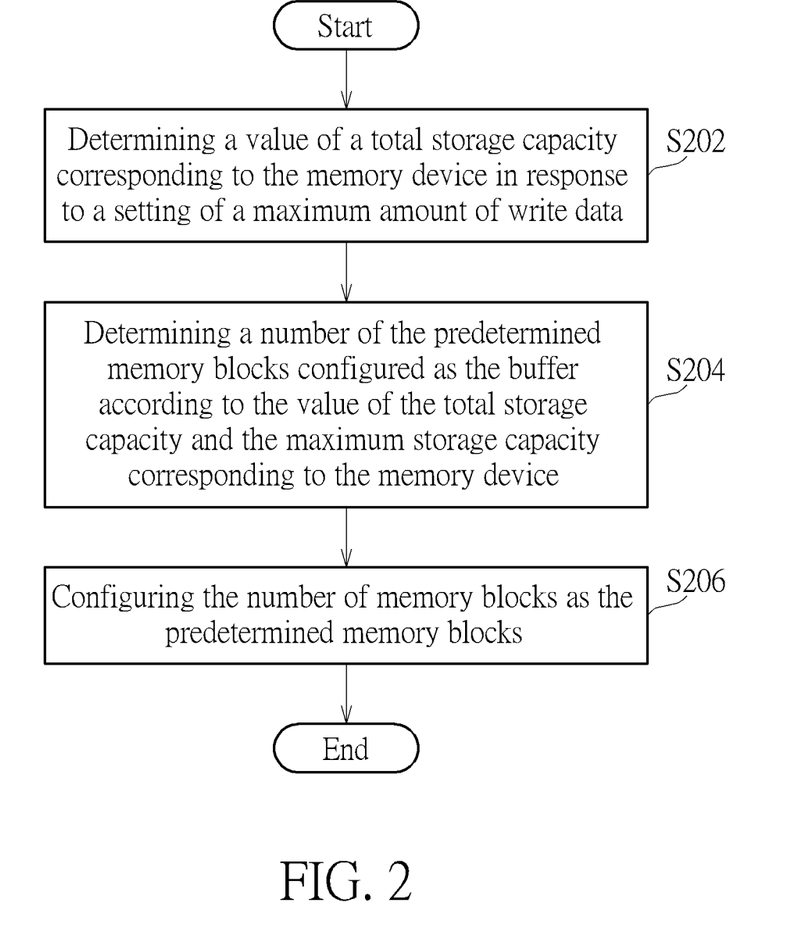
FIG. 2 shows an exemplary flow chart of a method for dynamically determining a buffer size according to an embodiment of the invention.

FIG. 2 shows an exemplary flow chart of a method for dynamically determining a buffer size according to an embodiment of the invention. The method may comprise the following steps performed by the memory controller 110:

Step S202: determining (or, modifying) a value of a total storage capacity corresponding to the memory device 120 in response to a setting of a maximum amount of write data. As described above, the memory device 110 may use the parameter Total_Capacity to record the total storage capacity corresponding to the memory device 120. Therefore, in step S202, in response to the setting of the maximum amount of write data, the memory controller 110 may determine or modify the value of the parameter Total_Capacity according to a current (i.e., the latest) setting value of the maximum amount of write data. In addition, in an embodiment of the invention, the maximum amount of write data may be set by a user of the host device 130 or a user of the data storage system. As an example, the user may use an input device (not shown in the figures) and through an user interface to set the currently required maximum amount of write data. When receiving the current setting value of the maximum amount of write data input by the user, the host device 130 may provide this information to the memory controller 110 through the host interface 138.

Step S204: determining a number of the one or more predetermined memory blocks configured as the buffer according to the value of the total storage capacity and the maximum storage capacity. As described above, the memory controller 110 may calculate the currently configurable buffer size with reference to the value of the parameter MAX_Capacity and the value of the parameter Total_Capacity determined or modified in step S202, where the buffer size corresponds to the number of predetermined memory blocks.

Step S206: configuring the aforementioned number of predetermined memory blocks. As described above, the memory controller 110 may configure a specific number (e.g., the number determined in step S204) of memory blocks as the buffer by selecting the specific number of memory blocks from the memory blocks or from the spare memory blocks that are not written with data and configuring the selected memory blocks as a specific type of memory blocks, for being the predetermined memory blocks.

In the embodiments of the invention, the memory controller 110 may repeatedly perform steps S202 to S206 to dynamically adjust the buffer size. For example, the memory controller 110 may start to perform steps S202-S206 in response to reception of a current setting value of the maximum amount of write data from the host device 130 or in response to a change in the current setting value of the maximum amount of write data, so as to dynamically adjust the buffer size.

According to an embodiment of the invention, in step S204, the memory controller 110 may calculate the currently configurable buffer size according to the following equation Eq. (1):

$$\text{Cache\_Size} + (\text{MAX\_Capacity} - m * \text{Cache\_Size}) = \text{MAX\_Write} \quad \text{Eq. (1)}$$

where the parameter Cache_Size represent the configured buffer size, the parameter MAX_Write represents the current setting value of the maximum amount of write data determined based on the current user requirement, the parameter m represents the ratio of a number of bits (e.g., 3 bits for the TLC block) can be stored in one memory cell of the highest level of currently configurable type of memory block (e.g., the TLC block) and a number of bits (e.g., 1 bit for the SLC block) of the type of memory block (e.g., the SLC block) configured as the buffer, and where m>1.

When the equation Eq. (1) is rearranged, a relationship is expressed in the following equation Eq. (2).

$$\text{Cache\_Size} = (\text{MAX\_Capacity} - \text{MAX\_Write})/(m-1) \quad \text{Eq. (2)}$$

Taking the memory device having the parameter settings: MAX_Capacity=900 GB and m=3 as an example, the equation Eq. (2) may be rewritten as the following equation Eq. (3):

$$\text{Cache\_Size} = (900 - \text{MAX\_Write})/2 \quad \text{Eq. (3)}$$

Assuming that the current setting value of the maximum amount of write data MAX_Write set by the user is 300 GB. Under this setting, the upper limit of the data size to be written to the memory device 120 by the user is 300 GB, and all the memory blocks in the memory device 120 may be configured as the SLC memory blocks. In addition, all the SLC memory blocks may be configured as the buffer. Since the SLC memory block has a faster write speed than other types of memory blocks, when the memory space required by the user is relative small, the above settings may be used so that the extra memory space (e.g., 600 GB obtained by (900 GB−300 GB)) is exchanged for high access speed. On the contrary, when the user requires larger memory space, exchange the access speed for larger memory space may be achieved by changing the above setting.

Figure 3:
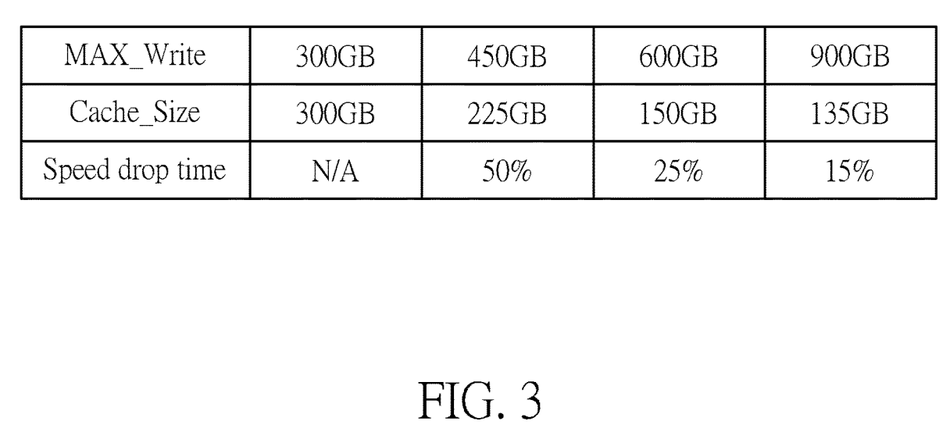
FIG. 3 is an exemplary table showing the configurable buffer size and the predicted time when a write speed drop occurs under different settings of the maximum amount of write data.

FIG. 3 is an exemplary table showing the configurable buffer size and the predicted time when a write speed drop occurs under different settings of the maximum amount of write data. In FIG. 3, the example of the memory device having the parameter settings: MAX_Capacity=900 GB and m=3 is again used, and the predicted time when a write speed drop occurs is expressed as a percentage of the maximum amount of write data, to represent that when the amount of data written by the user reaches which percent of the maximum amount of write data set by the user will cause the write speed drop due to the need of performing data rearrangement operation on the memory block 120 by the memory controller 110. In the example shown in FIG. 3, the timing to trigger data rearrangement operation is set to the condition when the buffer is full. Therefore, the predicted time when a write speed drop occurs, which is expressed as a percentage, is also equivalent to the percentage of the buffer size to the maximum amount of write data.

As shown in FIG. 3, when the maximum amount of write data MAX_Write is set to 300 GB, since all the memory blocks in the memory device 120 are configured as the SLC memory blocks, there is no need for the memory controller 110 to perform data rearrangement on the memory blocks, and thus, the write speed drop will not occur (which is labeled by N/A). When the maximum amount of write data MAX_Write is set to 450 GB, the configured buffer size is 225 GB (Cache_Size=225 GB), and the write speed drop is predicted to occur when the amount of data written by the user reaches half of the maximum amount of write data MAX_Write set by the user. When the maximum amount of write data MAX_Write is set to 600 GB, the configured buffer size is 150 GB (Cache_Size=150 GB), and the write speed drop is predicted to occur when the amount of data written by the user reaches a quarter of the maximum amount of write data MAX_Write set by the user.

The table in FIG. 3 shows the tradeoff between the access speed and available memory space. It is to be noted that the equations Eq. (1) to Eq. (3) provided above are merely one of a variety of embodiments of the invention. As the proposed method for dynamically determining the buffer size may calculate the size of the currently configurable buffer according to the maximum amount of write data set by the user in various different ways based on the same or similar concept, the invention is not limited to use only the equations as described above.

In addition, the host device 130 may issue a read capacity command to the memory controller 110 to read the capacity information of the memory device 120. Therefore, in the embodiments of the invention, although the total storage capacity corresponding to the memory device 120 (which is corresponding to the parameter Total_Capacity) may be set to the maximum storage capacity provided by the memory blocks (which is corresponding to the parameter MAX_Capacity) by default, after determining or modifying the value of the parameter Total_Capacity corresponding to the total storage capacity according to the maximum amount of write data MAX_Write, as an example, after performing step S202, in response to reception of a read capacity command received from the host device 130, the memory controller 110 may reply to the host device with the determined or modified value of the total storage capacity (i.e., the parameter Total_Capacity) instead of a value corresponding to the maximum storage capacity (i.e., the parameter MAX_Capacity).

In addition, in the embodiments of the invention, the value of the total storage capacity (i.e., the parameter Total_Capacity) may be smaller than the value corresponding to the maximum storage capacity (i.e., the parameter MAX_Capacity). Continuing the previous example, assuming that the current setting value of the maximum amount of write data MAX_Write set by the user is 300 GB, in response to this setting, the memory controller 110 may determine or modify the recorded value with respect to the parameter Total Capacity to 300 GB, which is smaller than 900 GB (the maximum of storage capacity of the memory device 120).

In addition, according to an embodiment of the invention, after the memory controller 110 replies to the host device 130 with the determined or modified value of the total storage capacity, the value is displayed on a user interface of the host device 130 as a maximum storage capacity of the data storage device 100 identified by the host device 130 (e.g., the maximum of storage capacity provided by the data storage device 100). Continuing the previous example, the host device 130 may display the value of 300 GB of the maximum storage capacity of the data storage device 100 identified by itself on a user interface through a display device or a screen as the information regarding the memory size provided to the user. Therefore, in the embodiments of the invention, once the user modifies the setting value of the maximum amount of write data MAX_Write based on his needs, information regarding the memory size received or perceived by the user via the user interface changes as well.

In addition, according to an embodiment of the invention, the memory controller 110 may repeatedly determine or modify the value of the parameter Total_Capacity corresponding to the total storage capacity according to a current setting value of the maximum amount of write data, dynamically determine the number of the predetermined memory blocks to be configured as the buffer according to the value of the total storage capacity and the maximum storage capacity, and then configure the number of the predetermined memory blocks as the buffer. In addition, according to an embodiment of the invention, the predetermined memory blocks may be the SLC memory blocks, but the invention is also not limited thereto. Depending on the required access performance, the predetermined memory blocks may also be other types of memory blocks with further more levels.

Figure 4:
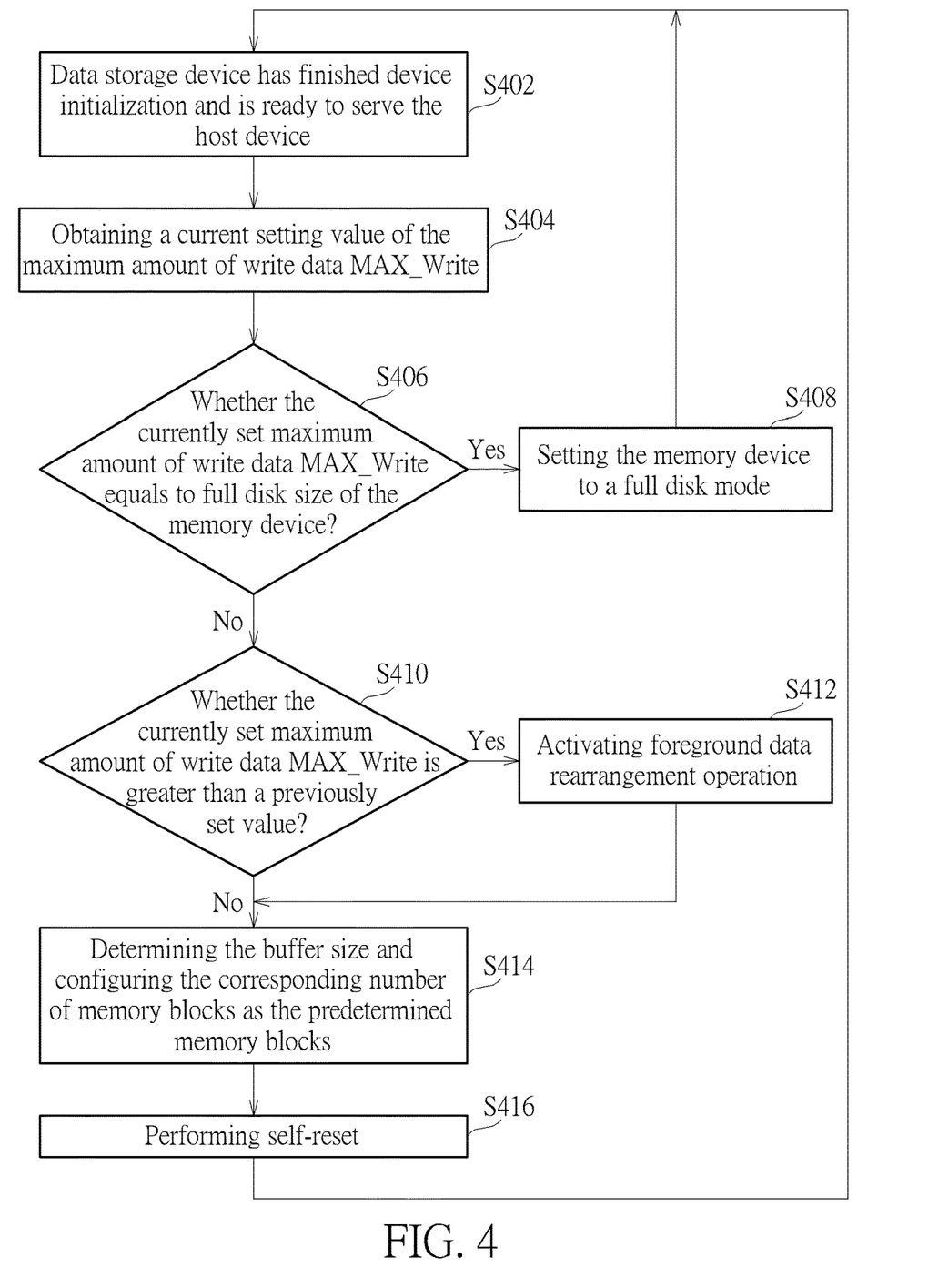
FIG. 4 shows a detailed flow chart of a method for dynamically determining a buffer size according to an embodiment of the invention.

FIG. 4 shows a detailed flow chart of a method for dynamically determining a buffer size according to an embodiment of the invention. The method may comprise the following steps performed by the memory controller 110:

Step S402: the data storage device has finished the device initialization and is ready to serve the host device. According to an embodiment of the invention, the device initialization of the data storage device 100 may comprise operations of setting the values of the parameter Total_Capacity corresponding to the total storage capacity and the parameter MAX_Capacity corresponding to the maximum storage capacity. The value of the maximum storage capacity provided by the memory blocks may be calculated from memory specifications or may be set during the product manufacturing, and the value of the total storage capacity may be set as the value of the maximum storage capacity provided by the memory blocks by default.

Step S404: obtaining a current setting value of the maximum amount of write data MAX_Write input by the user. As described above, the user may input the currently required maximum amount of write data through the user interface of the host device 130. When obtaining the current setting value of the maximum amount of write data input by the user, the host device 130 may further provide this information to the memory controller 110 through the memory interface 138. For example, the host device 130 may issue a vender command to the memory controller 110 to configure the maximum amount of write data MAX_Write.

Step S406: determining whether the currently set maximum amount of write data MAX_Write equals to the full disk size. According to an embodiment of the invention, the full disk size may be the aforementioned maximum storage capacity provided by the memory blocks. If the determination result shows yes, step S408 is performed. If the determination result shows no, step S410 is performed.

Step S408: setting the memory device 120 to a full disk mode. In the full disk mode, the memory controller 110 does not dynamically adjust the buffer size until the maximum amount of write data MAX_Write input by the user is smaller than the full disk size.

Step S410: determining whether the currently set maximum amount of write data MAX_Write is greater than a previously set maximum amount of write data MAX_Write. If the determination result shows yes, it means that the user need more storage space, and step S412 is performed. If the determination shows no, step S414 is performed.

Step S412: activating foreground data rearrangement operation. According to an embodiment of the invention, the foreground data rearrangement operation is an operation that the host device 130 will be notified. Therefore, when performing the foreground data rearrangement operation, the host device 130 has to stop accessing to the data storage device 100. On the contrary, the background data rearrangement operation is an operation that the host device 130 will not be notified. The memory controller 110 performs the data rearrangement operation when the memory device 120 is idle. Therefore, there is no need for the host device 130 to stop accessing to the data storage device 100.

Step S414: determining the buffer size and configuring the corresponding number of memory blocks as the predetermined memory blocks. Regarding the calculation of the currently configurable buffer size, reference may be made to the previous paragraphs, and will not be repeated here for brevity.

Step S416: the data storage device 100 performing self-reset. In an embodiment of the invention, the self-reset operation may comprise actively cutting off the connection between the host interface 118 and the host device 130 at the device side, and re-establishing the connection with the host device 130, forcing the host device 130 to re-identify the data storage device 100. In this manner, the host device issues a read capacity command to obtain the memory capacity information of the memory block 120 again, and may further display the value of the total storage capacity on the user interface of the host device 130 as the maximum storage capacity of the data storage device 100 identified by the host device 130.

As mentioned above, with the proposed method for dynamically determining the buffer size, the user determines the usage of the data storage device 100 based on his needs. If the user's usual use requires high speed rather than high capacity, the switching between the high speed of the data storage device 100 and high capacity may be achieved by setting the maximum amount of write data MAX_Write as described in the proposed method, thereby accordingly adjusting the buffer size which dominates the access speed of the data storage device 100. When the usage of the data storage device 100 or the user requirement changes, the switching between the access speed of the data storage device 100 and memory capacity may also be achieved in a similar way, for the status of the data storage device 100 being able to be switched between the optimal access performance mode and the maximum storage space mode.

In addition, in the embodiments of the invention, the user may also flexibly determine how many memory space he can sacrifice to exchange for the speed. The more memory space reduction (e.g., the smaller value of the total storage capacity), the more obvious improvement in the speed can be brought, so that the write speed is greatly increased and the user experience is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage device, comprising:
    a memory device, having a corresponding total storage capacity and comprising a plurality of memory blocks, wherein a value of the total storage capacity is set to a maximum storage capacity provided by the memory blocks by default and the memory blocks comprise one or more predetermined memory blocks configured to receive data from a host device; and
    a memory controller, coupled to the memory device to access the memory device, wherein in response to a setting of a maximum amount of write data, the memory controller determines the value of the total storage capacity according to the maximum amount of write data, and determines a number of said one or more predetermined memory blocks according to the value of the total storage capacity and the maximum storage capacity.

2. The data storage device of claim 1, wherein the maximum amount of write data is set by a user.

3. The data storage device of claim 1, wherein the memory controller receives a current setting value of the maximum amount of write data from the host device.

4. The data storage device of claim 1, wherein after determining the value of the total storage capacity according to the maximum amount of write data, the memory controller replies to the host device with the value of the total storage capacity instead of a value corresponding to the maximum storage capacity in response to a read capacity command received from the host device.

5. The data storage device of claim 4, wherein the value of the total storage capacity is smaller than the value corresponding to the maximum storage capacity.

6. The data storage device of claim 4, wherein after replying to the host device with the value of the total storage capacity, the value of the total storage capacity is displayed on a user interface of the host device as a maximum of storage capacity of the data storage device identified by the host device.

7. The data storage device of claim 1, wherein the memory controller repeatedly determines the value of the total storage capacity according to a current setting value of the maximum amount of write data and dynamically determines the number of said one or more predetermined memory blocks according to the value of the total storage capacity and the maximum storage capacity.

8. The data storage device of claim 1, wherein said one or more predetermined memory blocks is/are Single-Level Cell (SLC) memory block(s).

9. A method for dynamically determining a buffer size, comprising:
    determining a value of a total storage capacity corresponding to a memory device in response to a setting of a maximum amount of write data, wherein the memory device comprises a plurality of memory blocks, the memory blocks comprise one or more predetermined memory blocks configured as a buffer to receive data from a host device and the maximum amount of write data is set by a user; and
    determining a number of said one or more predetermined memory blocks according to the value of the total storage capacity and a maximum storage capacity, wherein the maximum storage capacity is a maximum of storage capacity provided by the memory blocks.

10. The method of claim 9, further comprising:
receiving a current setting value of the maximum amount of write data from the host device.

11. The method of claim 9, further comprising:
replying to the host device with the value of the total storage capacity instead of a value corresponding to the maximum storage capacity in response to a read capacity command received from the host device.

12. The method of claim 11, wherein the value of the total storage capacity is smaller than the value corresponding to the maximum storage capacity.

13. The method of claim 11, further comprising:
displaying the value of the total storage capacity on a user interface of the host device as a maximum of storage capacity of the data storage device identified by the host device.

14. The method of claim 9, wherein the value of the total storage capacity is repeatedly determined according to a current setting value of the maximum amount of write data and the number of said one or more predetermined memory blocks is dynamically determined according to the value of the total storage capacity and the maximum storage capacity.

15. The method of claim 9, wherein said one or more predetermined memory blocks is/are Single-Level Cell (SLC) memory block(s).

* * * * *